(12) United States Patent
Zhao et al.

(10) Patent No.: US 11,784,830 B2
(45) Date of Patent: Oct. 10, 2023

(54) METHOD FOR SENDING CERTIFICATE, METHOD FOR RECEIVING CERTIFICATE, CLOUD AND TERMINAL DEVICE

(71) Applicant: Beijing Baidu Netcom Science and Technology Co., Ltd., Beijing (CN)

(72) Inventors: Xin Zhao, Beijing (CN); Danfeng Lu, Beijing (CN); Sheng Chen, Beijing (CN); Jingru Xie, Beijing (CN)

(73) Assignee: Beijing Baidu Netcom Science Technology Co., Ltd., Beijing (CN)

(*) Notice: Subject to any disclaimer, the term of this patent is extended or adjusted under 35 U.S.C. 154(b) by 102 days.

(21) Appl. No.: 17/210,190

(22) Filed: Mar. 23, 2021

(65) Prior Publication Data
US 2021/0211310 A1    Jul. 8, 2021

(30) Foreign Application Priority Data
Sep. 30, 2020    (CN) .......................... 202011061776.6

(51) Int. Cl.
*H04L 9/32* (2006.01)
(52) U.S. Cl.
CPC .......... *H04L 9/3268* (2013.01); *H04L 9/3265* (2013.01)
(58) Field of Classification Search
CPC ............................ H04L 9/3268; H04L 9/3265
USPC ........................................................ 713/158
See application file for complete search history.

(56) References Cited

U.S. PATENT DOCUMENTS

| | | | |
|---|---|---|---|
| 7,900,048 B2* | 3/2011 | Andersson | G06F 21/51 705/51 |
| 8,984,281 B2* | 3/2015 | Nagasaki | G06F 9/445 705/59 |
| 9,100,171 B1* | 8/2015 | Peterson | H04L 63/062 |
| 11,240,043 B1* | 2/2022 | Leblang | H04L 67/025 |
| 2010/0205429 A1 | 8/2010 | Alrabady et al. | |
| 2012/0227114 A1 | 9/2012 | Okuyama et al. | |
| 2015/0372865 A1 | 12/2015 | Schmirler et al. | |
| 2018/0034644 A1 | 2/2018 | Komiya et al. | |

(Continued)

FOREIGN PATENT DOCUMENTS

| | | |
|---|---|---|
| CN | 109272314 A | 1/2019 |
| CN | 109714344 A | 5/2019 |
| CN | 110445614 A | 11/2019 |
| CN | 111066016 A | 4/2020 |
| CN | 111066284 A | 4/2020 |
| CN | 111212071 A | 5/2020 |

(Continued)

OTHER PUBLICATIONS

Japanese Office Action corresponding to Japanese Patent Application No. 2021-043040, dated Dec. 10, 2021 (5 pages).

(Continued)

*Primary Examiner* — Thanh T Le
(74) *Attorney, Agent, or Firm* — Maginot, Moore & Beck LLP

(57) ABSTRACT

A method includes acquiring a root certificate of a first node; generating a target sub-certificate based on the root certificate, where the target sub-certificate includes a first sub-certificate of a first functional module of a first application associated with the first node; and sending the target sub-certificate to a terminal device. The target sub-certificate is used for the first functional module of the first application in the terminal device communicating through the target sub-certificate. In such a manner, a capability of managing the first sub-certificate of the first functional module in the terminal device can be improved.

12 Claims, 5 Drawing Sheets

(56) References Cited

U.S. PATENT DOCUMENTS

| | | | |
|---|---|---|---|
| 2018/0034646 A1* | 2/2018 | Kuramoto | H04L 9/3268 |
| 2018/0316510 A1* | 11/2018 | Rai | H04L 9/3268 |
| 2019/0074980 A1* | 3/2019 | Loreskar | H04W 12/06 |
| 2020/0021447 A1* | 1/2020 | Ih | H04L 9/007 |
| 2020/0136838 A1* | 4/2020 | Kucharski | H04L 9/3265 |
| 2020/0259668 A1* | 8/2020 | Loreskar | G06F 21/53 |
| 2020/0366668 A1* | 11/2020 | Smith | H04L 67/142 |
| 2021/0126798 A1* | 4/2021 | Breitenbach | H04L 63/0823 |
| 2021/0377053 A1* | 12/2021 | Mahajan | H04L 63/0281 |

FOREIGN PATENT DOCUMENTS

| | | |
|---|---|---|
| CN | 111506416 A | 8/2020 |
| JP | 2008262353 A | 10/2008 |
| WO | 2011055486 A1 | 5/2011 |
| WO | 2016151824 A1 | 9/2016 |

OTHER PUBLICATIONS

English Translation of Japanese Office Action corresponding to Japanese Patent Application No. 2021-043040, dated Dec. 10, 2021 (5 pages).

English Translation of JP2008262353A. (19 Pages).

Extended European Search Report corresponding to European Patent Application No. 21164216.0, dated Aug. 27, 2021 (8 pages).

European Office Action corresponding to European Patent Application No. 21164216.0, dated Jun. 3, 2022 (7 pages).

Chinese Office Action corresponding to Chinese Patent Application No. 202011061776.6, dated Apr. 18, 2023 (9 pages).

English Translation of Chinese Office Action corresponding to Chinese Patent Application No. 202011061776.6, dated Apr. 18, 2023 (6 pages).

Chengappa, M. R., M. S. Shashidhara, and A. Pandurangan. "A comprehensive study of prototyping a framework for commissioning and distribution of authenticated certificates for e-transactions using cloud technology." 2013 International Conference on Emerging Trends in Communication, Control, Signal Processing and Computing Applications (C2SPCA). IEEE, 2013.

Zhu, G., H. Ning, and D. He. "Leak in trusted root certificates management and the method for solving." Journal-China Institute of Communications 26.6 (2005): 100.

Machine English Translation of CN110445614A. (50 Pages).

Machine English Translation of CN111066284B. (51 Pages).

Machine English Translation of CN111212071A. (31 Pages).

* cited by examiner

METHOD FOR SENDING CERTIFICATE, METHOD FOR RECEIVING CERTIFICATE, CLOUD AND TERMINAL DEVICE

CROSS-REFERENCE TO RELATED APPLICATION

This application claims priority to Chinese Patent Application No. 202011061776.6 filed on Sep. 30, 2020, the disclosure of which is incorporated in its entirety by reference herein.

TECHNICAL FIELD

The present application relates to the technical field of certificate management in computer technology, in particular to a method for sending a certificate, a method for receiving a certificate, a cloud, and a terminal device.

BACKGROUND

A certificate plays a vital role in communications and can improve communication security. For example, a module in a terminal device needs to communicate with other modules, and the module may communicate with other modules based on a corresponding certificate, so as to improve communication security.

At present, a certificate issuance module is usually provided in the terminal device. A certificate is generated through the certificate issuance module of the terminal device. The terminal device communicates by using the certificate generated locally.

SUMMARY

A method for sending a certificate, a method for receiving a certificate, a cloud, and a terminal device are provided in the present application.

In a first aspect, an embodiment of the present application provides a method for sending a certificate, applied to a cloud. The method includes: acquiring a root certificate of a first node; generating a target sub-certificate based on the root certificate, where the target sub-certificate includes a first sub-certificate of a first functional module of a first application associated with the first node; and sending the target sub-certificate to a terminal device. The target sub-certificate is used for the first functional module of the first application in the terminal device communicating through the target sub-certificate.

In the method for sending the certificate of the embodiment, the cloud acquires the root certificate of the first node first, and generates the target sub-certificate including the first sub-certificate of the first functional module of the first application associated with the first node based on the root certificate, i.e., the cloud generates the target sub-certificate, and then sends the generated target sub-certificate to the terminal device. In this way, the first functional module of the first application in the terminal device may communicate through a corresponding target sub-certificate. That is, in the embodiment, a capability of managing the first sub-certificate of the first functional module in the terminal device may be improved through the first sub-certificate of the first functional module of the first application associated with the first node issued by the cloud.

In a second aspect, an embodiment of the present application provides a method for receiving a certificate, applied to a terminal device and including: receiving a target sub-certificate sent by a cloud. The target sub-certificate includes a first sub-certificate of a first functional module of a first application associated with a first node. The first functional module of the first application in the terminal device communicates through the target sub-certificate.

In the method for receiving the certificate of the embodiment, the terminal device receives the target sub-certificate including the first sub-certificate of the first functional module of the first application associated with the first node. In this way, the first functional module of the first application in the terminal device may communicate through the target sub-certificate. That is, in the embodiment, the first sub-certificate of the first functional module of the first application associated with the first node is issued by the cloud, and the terminal device receives the first sub-certificate of the first functional module of the first application associated with the first node issued by the cloud. Thus, a capability of managing the first sub-certificate of the first functional module in the terminal device can be improved.

In a third aspect, an embodiment of the present application provides an apparatus for sending a certificate, applied to a cloud and including: an acquisition module, configured to acquire a root certificate of a first node; a generation module, configured to generate a target sub-certificate based on the root certificate, where the target sub-certificate includes a first sub-certificate of a first functional module of a first application associated with the first node; and a first sending module, configured to send the target sub-certificate to a terminal device, where the target sub-certificate is used for the first functional module of the first application in the terminal device communicating through the target sub-certificate.

In a fourth aspect, an embodiment of the present application provides an apparatus for receiving a certificate, applied to a terminal device and including: a second receiving module, configured to receive a target sub-certificate sent by a cloud. The target sub-certificate includes a first sub-certificate of a first functional module of a first application associated with a first node. The first functional module of the first application in the terminal device communicates through the target sub-certificate.

In a fifth aspect, an embodiment of the present application provides a cloud, including: at least one processor; and a memory communicatively connected to the at least one processor; where, the memory stores thereon an instruction executable by the at least one processor, and the instruction, when executed by the at least one processor, causes the at least one processor to perform the method for sending the certificate in each embodiment of the present application.

In a sixth aspect, an embodiment of the present application provides a terminal device, including: at least one processor; and a memory communicatively connected to the at least one processor; where, the memory stores thereon an instruction executable by the at least one processor, and the instruction, when executed by the at least one processor, causes the at least one processor to perform the method for receiving the certificate in each embodiment of the present application.

In a seventh aspect, an embodiment of the present application provides a non-transitory computer-readable storage medium having stored thereon computer instructions. The computer instruction is configured to cause a computer to perform the method for sending the certificate in each embodiment of the present application, or the method for receiving the certificate in each embodiment of the present application.

BRIEF DESCRIPTION OF THE DRAWINGS

The accompanying drawings are used for better understanding of solutions, but shall not be construed as limiting the present application. In these drawings.

DETAILED DESCRIPTION

The following describes exemplary embodiments of the present application with reference to accompanying drawings. Various details of the embodiments of the present application are included to facilitate understanding, and should be considered as being merely exemplary. Therefore, those of ordinary skill in the art should be aware that various changes and modifications can be made to the embodiments described herein without departing from the scope and spirit of the present application. Likewise, for clarity and conciseness, descriptions of well-known functions and structures are omitted below.

Figure 1:
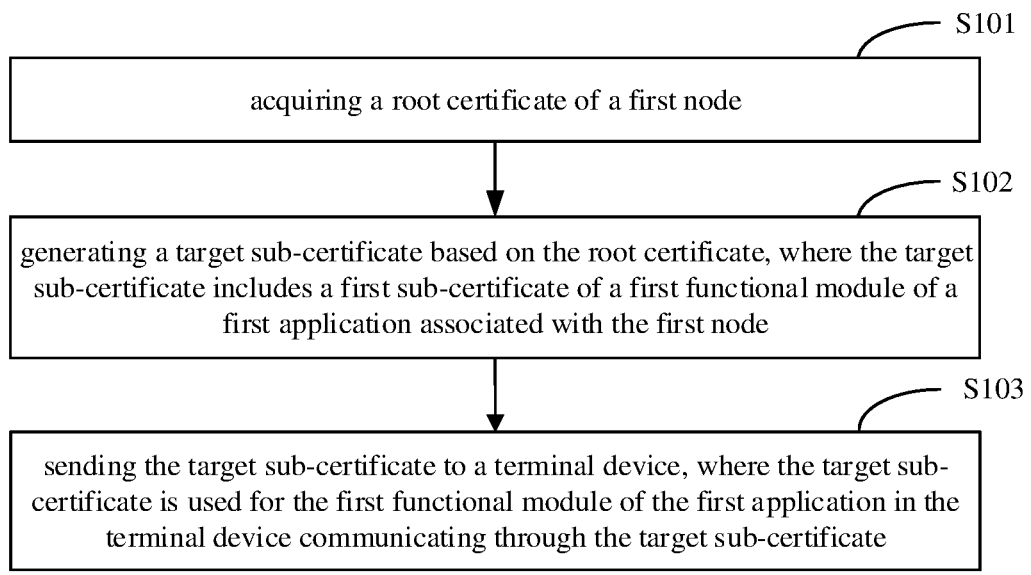
FIG. 1 is a flow diagram illustrating a method for sending a certificate according to an embodiment of the present application.

As shown in FIG. 1, according to an embodiment of the present application, the present application provides a method for sending a certificate. The method may be applied in an edge computing application scenario and include the following steps.

Step S101, acquiring a root certificate of a first node.

In the cloud, a node may be generated at first. For example, a node A is generated, a name attribute thereof is A. The node may be understood as node information, which may be used as a basis for associating with an application. After the node is generated, the cloud may associate the node with one or more corresponding applications. For example, a node A may be associated with an application 1 and an application 2. Each application has its own corresponding functional modules, and different functional modules of the application may achieve different functions of the application respectively. For example, the application 1 may include a functional module X and a functional module Y, the functional module X is used to achieve a call function of the application 1, and the functional module Y is used to achieve an image acquisition function of the application 1.

In the embodiment, the first node is any one of nodes generated by the cloud, that is, the first node is generated first, and then the root certificate of the first node is acquired. For example, the cloud may directly generate the root certificate of the first node (e.g., based on default information in the cloud) after the first node has been generated, to achieve the acquisition of the root certificate of the first node. Alternatively, after the first node has been generated, the cloud may receive information (such as contact information, area information and other information) inputted by a cloud user, and generate the root certificate of the first node based on the received information, to achieve the acquisition of the root certificate of the first node. Alternatively, after the first node has been generated, the cloud may receive the root certificate inputted by the cloud user to achieve the acquisition of the root certificate of the first node. For example, the root certificate of the first node may be a root certificate provided by an authoritative certificate authority (CA), or an N-level CA sub-certificate inputted by the cloud user (N is a positive integer).

Step S102, generating a target sub-certificate based on the root certificate, where the target sub-certificate includes a first sub-certificate of a first functional module of a first application associated with the first node.

After the root certificate of the first node has been acquired, the first sub-certificate of the first functional module of the first application associated with the first node may be generated according to the root certificate of the first node. Each functional module corresponding to the associated first application has a corresponding first sub-certificate. For example, the target sub-certificate issued based on the root certificate includes, but is not limited to, certificates for multiple purposes, such as a client sub-certificate, a service terminal certificate. For example, the first application may be understood as a first application list including at least one application, a node may be associated with one or more application lists, each list includes one or more functional modules, and a functional module may be associated with zero or more sub-certificates.

Step S103, sending the target sub-certificate to a terminal device, where the target sub-certificate is used for the first functional module of the first application in the terminal device communicating through the target sub-certificate.

After the target sub-certificate has been generated based on the root certificate, the target sub-certificate may be sent to the terminal device. The terminal device receives the target sub-certificate, and the first functional module of the first application of the terminal device may communicate through the target sub-certificate. For example, the first functional module includes a functional module W and a functional module Z, which respectively have corresponding first sub-certificates. When the functional module W needs to communicate after being started, it may communicate based on a corresponding first sub-certificate. When the functional module Y needs to communicate after being started, it may communicate based on another corresponding first sub-certificate.

It should be noted that the terminal device may be an edge device. The terminal device include, but is not limited to, devices on which various operating systems (OS), such as MacOS, Linux, operate based on an advanced reduced instruction set computing machine (ARM), an advanced micro device (AMD) and other architectures.

As an example, communication modes between the cloud and the terminal device include, but are not limited to, communication modes through a message queuing telemetry transport (MQTT) protocol, a hypertext transfer protocol (HTTP), etc.

In the method for sending the certificate of the embodiment, the cloud acquires the root certificate of the first node first, and generates the target sub-certificate including the first sub-certificate of the first functional module(s) of the first application associated with the first node based on the root certificate, i.e., the cloud generates the target sub-certificate, and then sends the generated target sub-certificate to the terminal device. In this way, the first functional module(s) of the first application in the terminal device may communicate through a corresponding target sub-certificate. That is, in the embodiment, a capability of managing the first sub-certificate(s) of the first functional module(s) in the terminal device is improved by the cloud issuing the first sub-certificate(s) of the first functional module(s) of the first application associated with the first node. At the same time, the cloud generates the first sub-certificate(s) of the first functional module(s) of the first application associated with the first node, and issues the same to the terminal device uniformly, so as to achieve synchronization between the cloud and the terminal device about the first sub-certificate(s) of the first functional module(s) of the first application associated with the first node.

Optionally, the target sub-certificate further includes a second sub-certificate of a second functional module.

Figure 2:
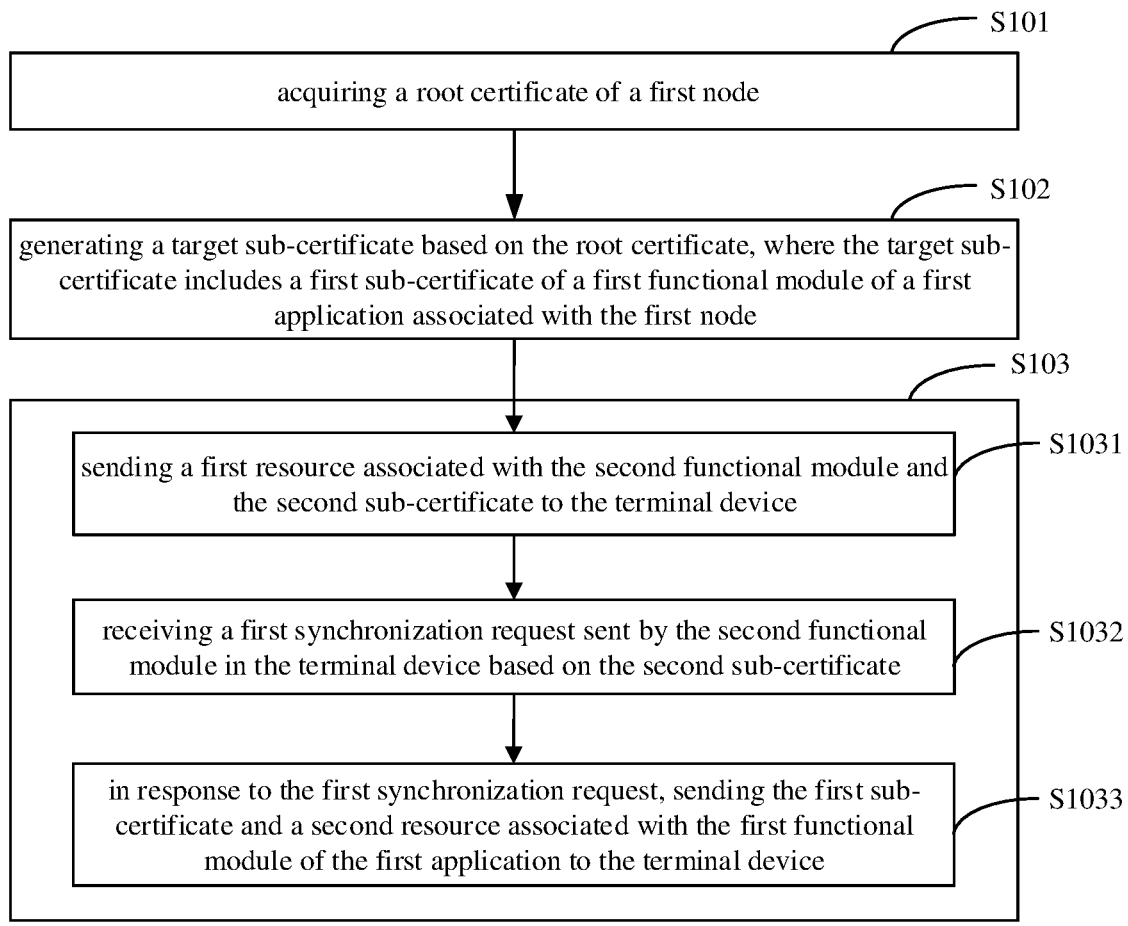
FIG. 2 is a flow diagram illustrating the method for sending the certificate according to another embodiment of the present application.

Please referring to FIG. 2, the step S103 of sending the target sub-certificate to the terminal device, includes:

step S1031, sending a first resource associated with the second functional module and the second sub-certificate to the terminal device;

step S1032, receiving a first synchronization request sent by the second functional module in the terminal device based on the second sub-certificate; and step S1033, in response to the first synchronization request, sending the first sub-certificate and a second resource associated with the first functional module of the first application to the terminal device.

In an embodiment, the cloud sends the first resource associated with the second functional module and the second sub-certificate of the second functional module to the terminal device. It should be noted that, the second functional module may be an edge-side core module (i.e., a Core module), the second functional module may be used to communicate with the cloud, and the first node is associated with the second functional module by default. The first resource may include, but not limited to, an installation resource (such as an installation package) of the second functional module. After receiving the first resource associated with the second functional module and the second sub-certificate, the terminal device may transmit them to a resource management center (such as an application programming interface (API) server) of the terminal device, the resource management center installs the second functional module based on the first resource, and then starts the second functional module. After the second functional module is started, it may send the first synchronization request to the cloud. In response to the first synchronization request, the cloud sends the first sub-certificate and the second resource associated with the first functional module of the first application to the second functional module of the terminal device. The second functional module of the terminal device receives the first sub-certificate and the second resource associated with the first functional module of the first application, which are issued by the cloud in response to the first synchronization request. As an example, the second resource may include, but is not limited to, an installation resource of the first functional module and the like. The second resource associated with the first functional module is used by the resource management center of the terminal device to install the first functional module according to the second resource associated with the first functional module. After the installation is successful, the first functional module may be started. After the first functional module is started, it may communicate based on the corresponding first sub-certificate. It may be appreciated that, after the terminal device receives the first sub-certificate and the second resource associated with the first functional module of the first application through the second functional module, and transmits them to the resource management center. The resource management center starts the first functional module. In this way, the first functional module may communicate based on the corresponding first sub-certificate.

In the embodiments, the first resource associated with the second functional module and the second sub-certificate are sent to the terminal device. The synchronization of the first sub-certificate and the second resource between the cloud and the terminal device is achieved based on interactions between the second functional module of the terminal device and the cloud, thereby ensuring the synchronization of sub-certificates and resources between the cloud and the terminal device.

Optionally, after sending the target sub-certificate to the terminal device, the method further includes: in a case that the target sub-certificate includes an expired sub-certificate, updating the expired sub-certificate in the target sub-certificate to a new sub-certificate, and acquiring an updated target sub-certificate.

The cloud may check a validity period of the target sub-certificate, that is, check whether there is an expired sub-certificate. In a case that the expired sub-certificate exists, a new sub-certificate of the first functional module corresponding to the expired sub-certificate is generated, that is, the sub-certificate of the first functional module is updated to the new sub-certificate, and the expired sub-certificate is no longer used. In this way, the validity of the sub-certificates of the first functional modules may be ensured.

As an example, the cloud may check the validity period periodically or when receiving a triggering request sent by the terminal device. In addition, a definition of expiration is determined according to actual service scenarios, for example, beyond the validity period.

Optionally, after updating the expired sub-certificate in the target sub-certificate to the new sub-certificate, and acquiring the updated target sub-certificate, the method further includes: in a case of receiving a second synchronization request sent by the terminal device, in response to the second synchronization request, sending the updated target sub-certificate or the new sub-certificate in the updated target sub-certificate to the terminal device.

The terminal device may periodically send the second synchronization request to the cloud, to request the synchronization of sub-certificates. The cloud updates the expired sub-certificate in the target sub-certificate to the new sub-certificate, and acquires the updated target sub-certificate, which indicates that the sub-certificate in the cloud is updated. In a case that the second synchronization request sent by the terminal device is received later, the cloud may send the updated target sub-certificate or only the new sub-certificate in the updated target sub-certificate to the terminal device in response to the second synchronization request. After the updated target sub-certificate or the new sub-certificate in the updated target sub-certificate has been received, the terminal device may update an original target sub-certificate in the terminal device, such that the target sub-certificate in the terminal device is synchronized with the updated target sub-certificate in the cloud.

That is, in the embodiment, the cloud may receive the second synchronization request sent by the terminal device, and send the updated target sub-certificate or the new sub-certificate in the updated target sub-certificate to the terminal device in response to the second synchronization request, thereby achieving the synchronization of sub-certificate(s) between the cloud and the terminal device.

In summary, the cloud may be used for node information management, and management of various resources, which includes: certificate generation, update, issuance and the like, performing resource information synchronization with the terminal device, and providing Open API, etc.

Figure 3:
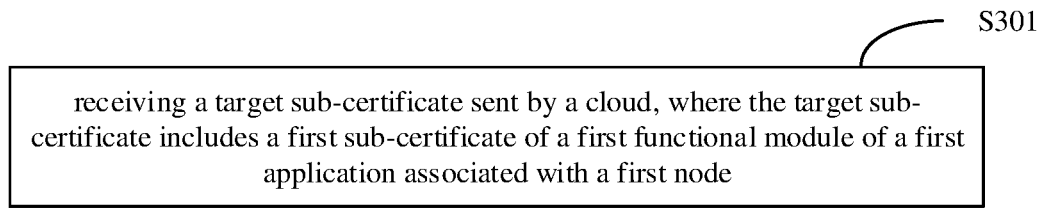
FIG. 3 is a flow diagram illustrating a method for receiving a certificate according to an embodiment of the present application.

As shown in FIG. 3, the present application further provides in an embodiment a method for receiving a certificate, applied to a terminal device. The method may be applied in an edge computing application scenario and include: step S301, receiving a target sub-certificate sent by a cloud, where the target sub-certificate includes a first sub-certificate of a first functional module of a first application associated with a first node. The first functional module of the first application in the terminal device communicates through the target sub-certificate.

After generating the target sub-certificate based on the root certificate, the cloud may send the target sub-certificate to the terminal device. The terminal device receives the target sub-certificate, and the first functional module of the first application of the terminal device may communicate through the target sub-certificate. For example, the first functional module includes a functional module W and a functional module Z, which respectively have corresponding first sub-certificates. When the functional module W needs to communicate after being started, it may communicate based on a corresponding first sub-certificate. When the functional module Y needs to communicate after being started, it may communicate based on another corresponding first sub-certificate. It should be noted that the target sub-certificate is a sub-certificate generated based on the root certificate of the first node acquired by the terminal device.

In the method for receiving the certificate of the embodiment, the terminal device receives a target sub-certificate including a first sub-certificate of a first functional module of a first application associated with a first node. In this way, the first functional module of the first application in the terminal device may communicate through the target sub-certificate. That is, in the embodiment, the first sub-certificate of the first functional module of the first application associated with the first node is issued by the cloud, and the terminal device receives the first sub-certificate of the first functional module of the first application associated with the first node issued by the cloud. Thus, a capability of managing the first sub-certificate(s) of the first functional module(s) in the terminal device may be improved. At the same time, the terminal device receives the first sub-certificate(s) of the first functional module(s) of the first application(s) associated with the first node generated and issued by the cloud, so as to achieve synchronization between the cloud and the terminal device about the first sub-certificate(s) of the first functional module(s) of the first application(s) associated with the first node.

Figure 4:
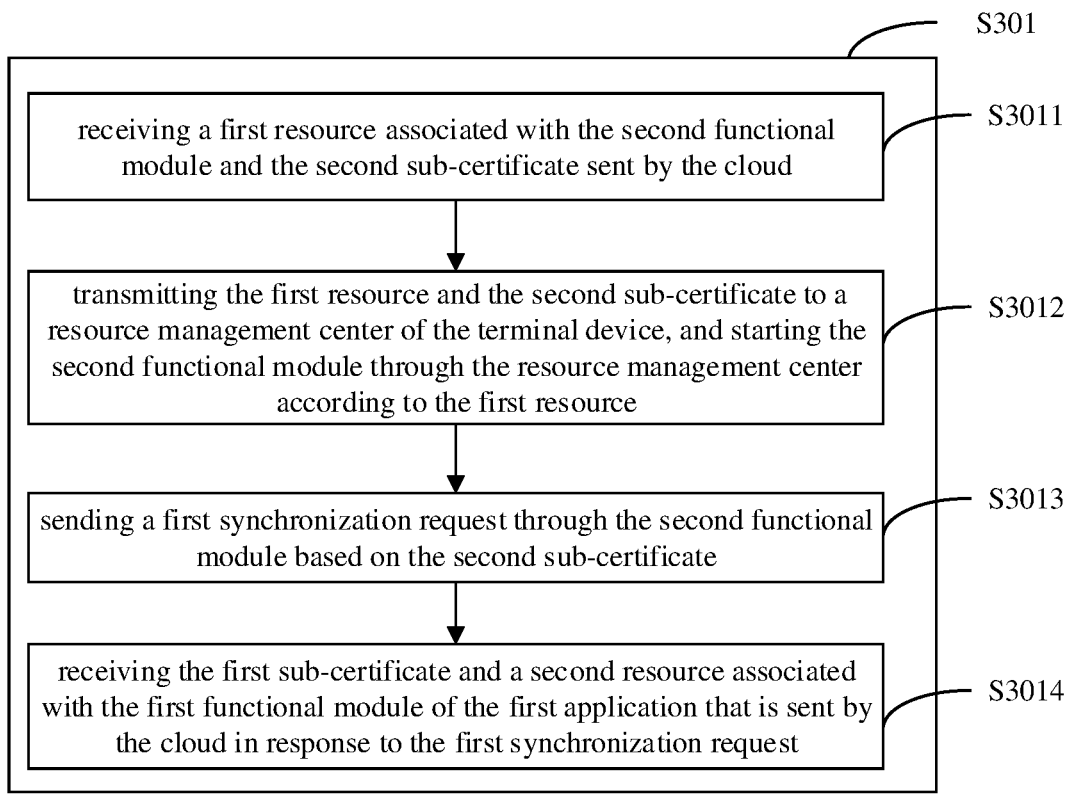
FIG. 4 is a flow diagram illustrating the method for receiving the certificate according to another embodiment of the present application.

Optionally, the target sub-certificate further includes a second sub-certificate of a second functional module, as shown in FIG. 4, the step S301 of receiving the target sub-certificate sent by the cloud includes:

step S3011, receiving a first resource associated with the second functional module and the second sub-certificate sent by the cloud;

step S3012, transmitting the first resource and the second sub-certificate to a resource management center of the terminal device, and starting the second functional module through the resource management center according to the first resource;

step S3013, sending a first synchronization request through the second functional module based on the second sub-certificate; and step S3014, receiving the first sub-certificate and a second resource associated with the first functional module of the first application that is sent by the cloud in response to the first synchronization request.

In the process of receiving the target sub-certificate sent by the cloud in the embodiment, a terminal first receives the first resource associated with the second functional module and the second sub-certificate of the second functional module sent by the cloud. After receiving the first resource associated with the second functional module and the second sub-certificate, the terminal device may transmit them to the resource management center of the terminal device. The resource management center installs the second functional module based on the first resource, and then starts the second functional module. After the second functional module is started, it may send the first synchronization request to the cloud. In response to the first synchronization request, the cloud sends the first sub-certificate and the second resource associated with the first functional module of the first application to the second functional module of the terminal device. The second functional module of the terminal device receives the first sub-certificate and the second resource associated with the first functional module of the first application, which are issued by the cloud in response to the first synchronization request. It may be appreciated that, after the terminal device receives the first sub-certificate and the second resource associated with the first functional module of the first application through the second functional module, and transmits them to the resource management center. The resource management center starts the first functional module. In this way, the first functional module may communicate based on the corresponding first sub-certificate. At the same time, the first functional module may also perform operations such as security service startup, security request and security authentication through the corresponding first sub-certificate.

In the embodiments, the terminal device receives the first resource associated with the second functional module and the second sub-certificate sent by the cloud, and the terminal device achieves the synchronization of the first sub-certificate and the second resource between the cloud and the terminal device through interactions between the second functional module and the cloud, thereby ensuring the synchronization of sub-certificates and resources between the cloud and the terminal device.

As an example, the second resource synchronized by the second functional module may be stored, but not limited to, in a memory, a file, a database, an Etcd (a highly available key/value storage system), an hierarchical storage management (HSM) of the terminal device, the resource management center includes, but is not limited to, a K8S/K3S-based API server, a file manager, etc.

Optionally, after receiving the target sub-certificate sent by the cloud, the method further includes: sending a second synchronization request to the cloud; and receiving an updated target sub-certificate or a new sub-certificate in the updated target sub-certificate that are sent by the cloud in response to the second synchronization request, where the updated target sub-certificate is a sub-certificate acquired by updating an expired sub-certificate in the target sub-certificate to the new sub-certificate.

The cloud may check a validity period of the target sub-certificate, that is, check whether there is an expired sub-certificate. In a case that the expired sub-certificate exists, a new sub-certificate of the first functional module corresponding to the expired sub-certificate is generated, that is, the sub-certificate of the first functional module is updated to the new sub-certificate, and the expired sub-certificate is no longer used. In this way, the validity of the sub-certificate(s) of the first functional module(s) may be ensured. The terminal device may periodically send the second synchronization request to the cloud, to request the synchronization of the sub-certificate. In a case that the target sub-certificate in the cloud is updated, the cloud may send the updated target sub-certificate to the terminal device, or just send the new sub-certificate in the updated target sub-certificate to the terminal device in response to the second synchronization request. After the updated target sub-certificate or the new sub-certificate in the updated target sub-certificate has been received, the terminal device may update an original target sub-certificate in the terminal device, such that the target sub-certificate in the terminal device is synchronized with the updated target sub-certificate in the cloud.

That is, in the embodiment, the terminal device may send the second synchronization request to the cloud, and receive the updated target sub-certificate or the new sub-certificate in the updated target sub-certificate sent by the cloud in response to the second synchronization request, thereby achieving the synchronization of sub-certificates between the cloud and the terminal device.

Processes of the method for sending the certificate and the method for receiving the certificate will be described in detail with a specific embodiment below, taking that the node is a first node as an example.

Figure 5:
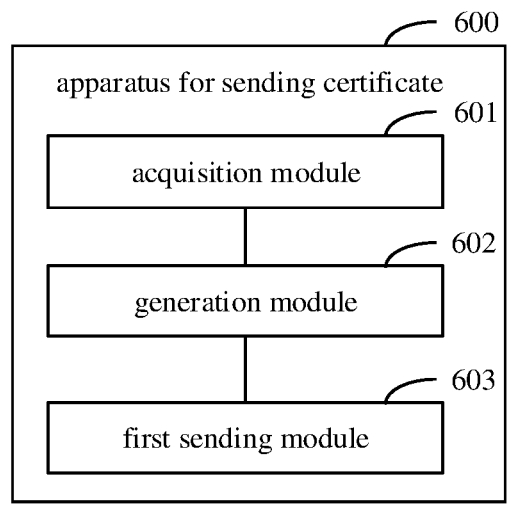
FIG. 5 is a schematic diagram of a certificate management system according to an embodiment of the present application.

FIG. 5 shows a certificate management system, including the cloud and the terminal device. The processes of implementing the method for sending the certificate and the method for receiving the certificate through the certificate management system are as follows.

First, the cloud generates the first node. A cloud system automatically generates the root certificate of the first node, or configures the root certificate for the first node according to information provided by a user.

Then, based on the root certificate of the first node, the first sub-certificate is generated for the first functional module of the first application list associated with the first node, and the second certificate is generated for the second functional module (the edge-side core module, i.e., the Core module).

The Core module is deployed in the terminal device. Specifically, the cloud first issues the first resource and the second sub-certificate of the Core module to the terminal device. The Core module is installed in the terminal device, and started. The terminal device communicates with the cloud for data reporting and synchronization of resource (including the second resource of the first functional module associated with the first node) through the Core module. The Core module may store synchronized resources in a local database through a store function.

Figure 6:
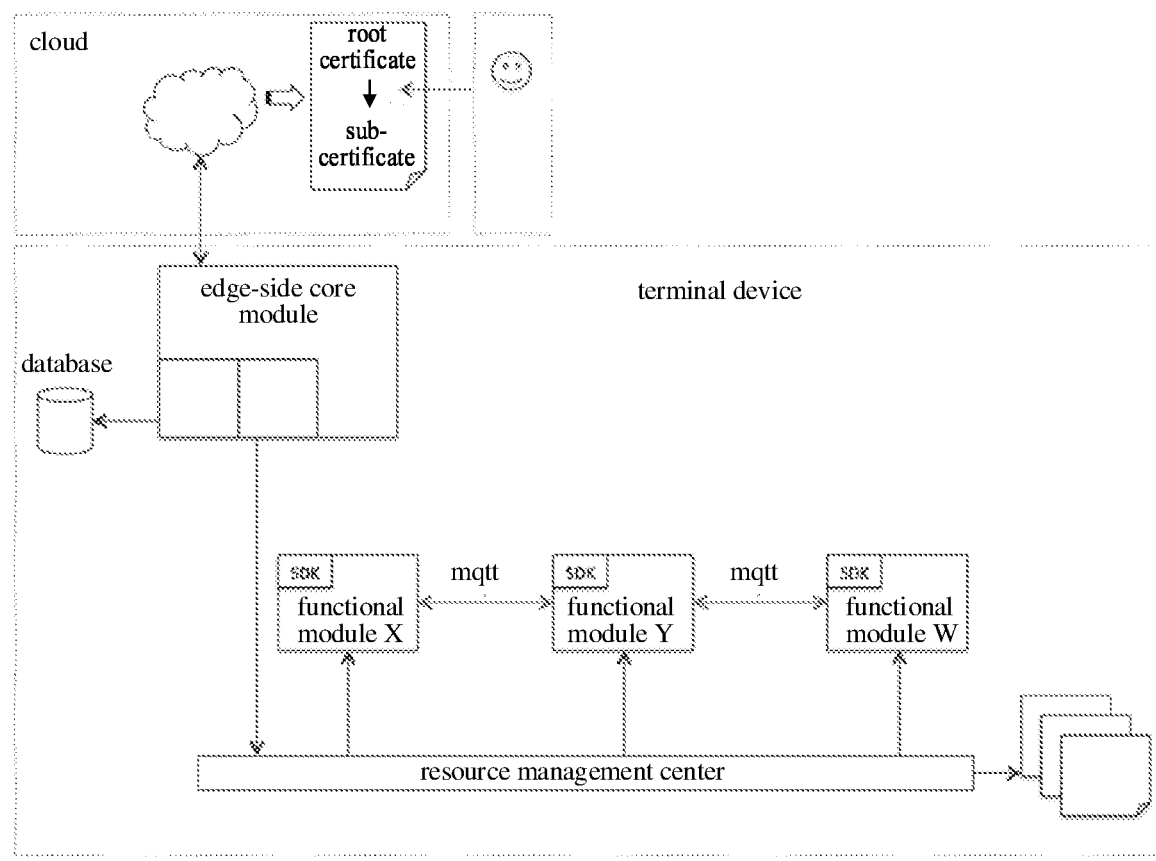
FIG. 6 is a structural diagram of an apparatus for sending a certificate according to an embodiment of the present application.

In addition, the Core module submits the synchronized second resource of the first functional module to the resource management center, such as the API server, which creates and deploys resources, that is, the first functional module is installed and started through the resource management center. As shown in FIG. 6, the first functional module may include a functional module X, a functional module Y and a functional module W.

After the first functional module has been started, secure communications may be performed through the mounted or mapped sub-certificate(s).

In each reporting period of the Core module, the cloud may check validity period information of each sub-certificate in the first node. If a sub-certificate is about to be or has been expired, the cloud may automatically generate a new sub-certificate and configure (associate) it to the corresponding first functional module.

The Core module may submit the synchronized new sub-certificate to the resource management center for module update and deployment.

In the embodiments of the present application, a unified certificate issuance and management process is achieved. The user can manage certificates used in nodes through the cloud, which includes: uploading trusted root certificates and performing an operation on sub-certificates associated with the nodes, such as adding, deleting, modifying and querying, and can apply modification of the user to the terminal device synchronously in real time.

In the embodiments of the present application, the capability for automatically replacing certificates when expired is provided. The terminal device maintains periodic data synchronization with the cloud. The cloud may periodically check the validity period of the certificates. When a sub-certificate is about to be or has been expired, the cloud may automatically generate a new sub-certificate and configure (associate) it to a node, thereby triggering the automatic synchronization mechanism of the node. Thus, the new certificate is issued and deployed to the terminal device to take effect.

As shown in FIG. 6, an embodiment of the present application provides an apparatus 600 for sending a certificate, applied to a cloud and including: an acquisition module 601, configured to acquire a root certificate of a first node; a generation module 602, configured to generate a target sub-certificate based on the root certificate, where the target sub-certificate includes a first sub-certificate of a first functional module of a first application associated with the first node; and a first sending module 603, configured to send the target sub-certificate to a terminal device, where the target sub-certificate is used for the first functional module of the first application in the terminal device communicating through the target sub-certificate.

Figure 7:
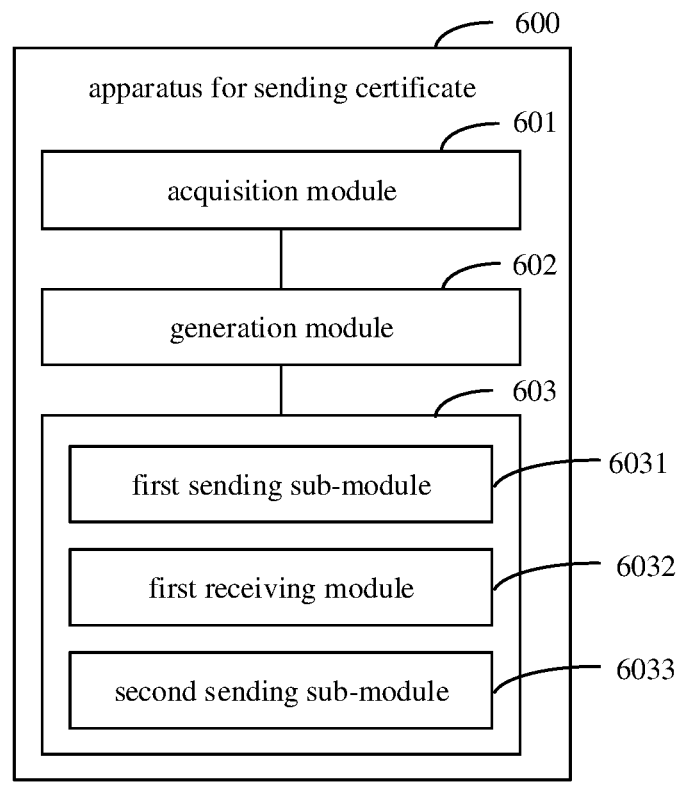
FIG. 7 is a structural diagram of the apparatus for sending the certificate according to another embodiment of the present application.

Optionally, the target sub-certificate further includes a second sub-certificate of a second functional module. As shown in FIG. 7, the first sending module 603 includes: a first sending sub-module 6031, configured to send a first resource associated with the second functional module and the second sub-certificate to the terminal device; a first receiving module 6032, configured to receive a first synchronization request sent by the second functional module in the terminal device based on the second sub-certificate; and a second sending sub-module 6033, configured to, in response to the first synchronization request, send the first sub-certificate and a second resource associated with the first functional module of the first application to the terminal device.

Optionally, the apparatus 600 further includes: an updating module, configured to, in a case that the target sub-certificate includes an expired sub-certificate, update the expired sub-certificate in the target sub-certificate to a new sub-certificate, and acquire an updated target sub-certificate.

Optionally, the apparatus 600 further includes: a second sending module, configured to, in a case of receiving a second synchronization request sent by the terminal device, in response to the second synchronization request, send the updated target sub-certificate or the new sub-certificate in the updated target sub-certificate to the terminal device.

The apparatus for sending the certificate in the above embodiments is an apparatus that implements the method for sending the certificate in the above embodiments, and technical features and technical effects thereof are corresponding to those of the method for sending the certificate in the above embodiments respectively, which are not repeated herein.

Figure 8:
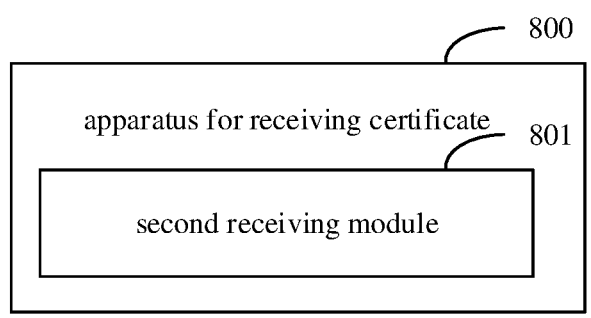
FIG. 8 is a structural diagram of an apparatus for receiving a certificate according to an embodiment of the present application.

As shown in FIG. 8, an embodiment of the present application further provides an apparatus 800 for receiving a certificate, applied to a terminal device and including: a second receiving module 801, configured to receive a target sub-certificate sent by a cloud. The target sub-certificate includes a first sub-certificate of a first functional module of a first application associated with a first node. The first functional module of the first application in the terminal device communicates through the target sub-certificate.

Figure 9:
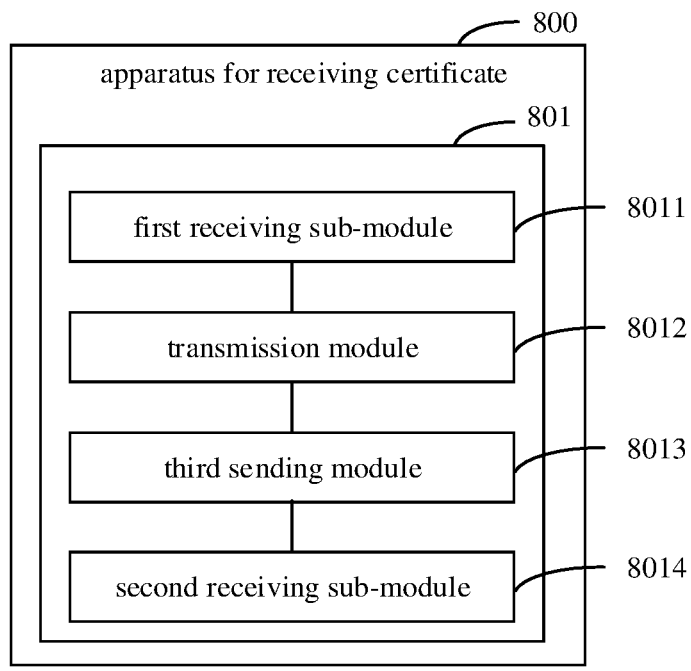
FIG. 9 is a structural diagram of the apparatus for receiving the certificate according to another embodiment of the present application.

Optionally, the target sub-certificate further includes a second sub-certificate of a second functional module. As shown in FIG. 9, the second receiving module 901 includes: a first receiving sub-module 8011, configured to receive a first resource associated with the second functional module and the second sub-certificate sent by the cloud; a transmission module 8012, configured to transmit the first resource and the second sub-certificate to a resource management center of the terminal device, and start the second functional module through the resource management center according to the first resource; a third sending module 8013, configured to send a first synchronization request through the second functional module based on the second sub-certificate; and a second receiving sub-module 8014, configured to receive the first sub-certificate and a second resource associated with the first functional module of the first application that are sent by the cloud in response to the first synchronization request.

Optionally, the apparatus 800 further includes: a fourth sending module, configured to send a second synchronization request to the cloud; and a third receiving module, configured to receive an updated target sub-certificate or a new sub-certificate in the updated target sub-certificate that are sent by the cloud in response to the second synchronization request, where the updated target sub-certificate is a sub-certificate acquired by updating an expired sub-certificate in the target sub-certificate to the new sub-certificate.

The apparatus for receiving the certificate in the above embodiments is an apparatus that implements the method for receiving the certificate in the above embodiments, and technical features and technical effects thereof are corresponding to those of the method for receiving the certificate in the above embodiments respectively, which are not repeated herein.

According to embodiments of the present application, a cloud, a terminal device and a readable storage medium are further provided.

Figure 10:
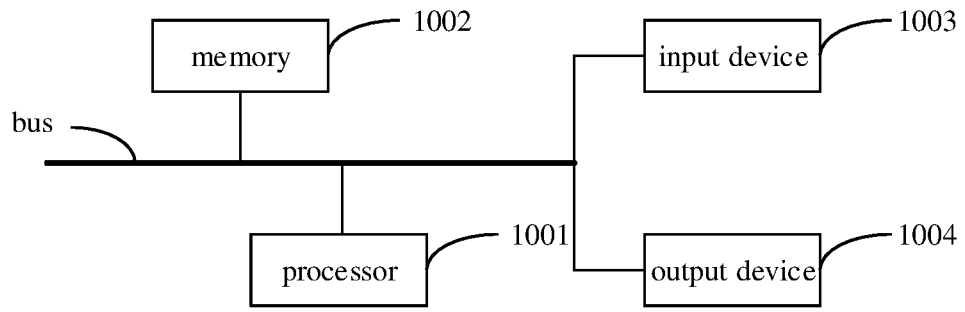
FIG. 10 is a block diagram of a cloud used to implement the method for sending the certificate in the embodiment of the present application.

FIG. 10 is a block diagram of a cloud used to implement the method for sending the certificate according to an embodiment of the present application. The cloud is intended to represent digital computers in various forms, such as a laptop computer, a desktop computer, a workstation, a personal digital assistant, a server, a blade server, a mainframe computer and other suitable computers. The components shown herein, connections and relationships thereof, and functions thereof are merely for illustrative, and are not intended to limit the implementations of the present application described and/or required herein.

As shown in FIG. 10, the cloud includes one or more processors 1001, a memory 1002, and an interface for connecting various components, including a high-speed interface and a low-speed interface. The components are connected to each other by using different buses, and may be installed on a common motherboard or in other ways as required. The processor may process an instruction executed in the cloud, including an instruction stored in or on the memory to display graphical information of a GUM on an external input/output device (such as a display device coupled to an interface). In another implementation, if necessary, a plurality of processors and/or a plurality of buses may be used together with a plurality of memories. Similarly, a plurality of clouds may be connected, and each device provides some necessary operations (for example, used as a server array, a group of blade servers, or a plurality of a multi-processor system). In FIG. 10, one processor 1001 is used as an example.

The memory 1002 is a non-transitory computer-readable storage medium provided in the present application. The memory stores an instruction that can be executed by at least one processor to perform the method for sending the certificate provided in the present application. The non-transitory computer-readable storage medium in the present application stores a computer instruction, and the computer instruction is executed by a computer to implement the method for sending the certificate provided in the present application.

As a non-transitory computer-readable storage medium, the memory 1002 may be used to store a non-transitory software program, a non-transitory computer-executable program, and a module, such as a program instruction/module corresponding to the method for sending the certificate in the embodiments of the present application (for example, the acquisition module 601, the generation module 602 and the first sending module 603 shown in FIG. 6). By executing the non-transitory software programs, instructions and modules stored in the memory 1002, the processor 1001 performs various functional applications and data processing in the server, that is, implementing the method for sending the certificate in the foregoing method embodiments.

The memory 1002 may include a program storage area and a data storage area, where the program storage area may store an operating system, and an application program required for at least one function; and the data storage area may store data created according to usage of the cloud for implementing the method for sending the certificate. In addition, the memory 1002 may include a high speed random access memory, and may also include a non-transitory memory, such as at least one magnetic disk storage device, a flash memory device, or other non-transitory solid state storage device. In some embodiments, the memory 1002 may optionally include a memory remotely located with respect to the processor 1001. These remote memories may be connected via a network to the cloud for implementing the method for sending the certificate. Examples of the network mentioned above include, but are not limited to, the Internet, an intranet, a local area network, a mobile communication network, and a combination thereof.

The cloud for implementing the method for sending the certificate may further include: an input device 1003 and an output device 1004. The processor 1001, the memory 1002, the input device 1003 and the output device 1004 may be connected to each other through a bus or in other ways. In FIG. 10, a bus for connection is used as an example.

The input device 1003 may receive digital or character information that is inputted, and generate key signal input related to a user setting and function control of the cloud having a keyboard and a display, such as a touch screen, a keypad, a mouse, a trackpad, a touchpad, and a pointing stick, one or more mouse buttons, a trackball, a joystick, or other input devices. The output device 1004 may include a display device, an auxiliary lighting apparatus (for example, an LED), a tactile feedback apparatus (for example, a vibration motor), and the like. The display device may include, but is not limited to, a liquid crystal display (LCD), a light emitting diode (LED) display, and a plasma display. In some implementations, the display device may be a touch screen.

The various implementations of the system and technology described herein may be implemented in a digital electronic circuit system, an integrated circuit system, an application specific integrated circuit (ASIC), computer hardware, firmware, software, and/or a combination thereof. The various implementations may include: implementation in one or more computer programs that may be executed and/or interpreted by a programmable system including at least one programmable processor. The programmable processor may be a dedicated or general-purpose programmable processor, and may receive data and instructions from a storage system, at least one input device and at least one output device, and transmit the data and the instructions to the storage system, the at least one input device and the at least one output device.

These computing programs (also referred to as programs, software, software applications, or codes) include machine instructions of a programmable processor, and may be implemented by using procedure-oriented and/or object-oriented programming language, and/or assembly/machine language. As used herein, the terms "machine-readable medium" and "computer-readable medium" refer to any computer program product, apparatus, and/or device (e.g., a magnetic disk, an optical disc, a memory, a programmable logic device (PLD)) for providing machine instructions and/or data to a programmable processor, including a machine-readable medium that receives machine instructions implemented as machine-readable signals. The term "machine-readable signal" refers to any signal used to provide machine instructions and/or data to a programmable processor.

To facilitate user interaction, the system and technique described herein may be implemented on a computer. The computer is provided with a display device (for example, a cathode ray tube (CRT) or liquid crystal display (LCD) monitor) for displaying information to a user, a keyboard and a pointing device (for example, a mouse or a track ball). The user may provide an input to the computer through the keyboard and the pointing device. Other kinds of devices may be provided for user interaction, for example, a feedback provided to the user may be any manner of sensory feedback (e.g., visual feedback, auditory feedback, or tactile feedback); and input from the user may be received by any means (including sound input, voice input, or tactile input).

The system and technique described herein may be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the system and technique described herein), or that includes any combination of such back-end component, middleware component, or front-end component. The components of the system can be interconnected in digital data communication (e.g., a communication network) in any form or medium. Examples of communication network include a local area network (LAN), a wide area network (WAN) and the Internet.

A computer system may include a client and a server. The client and the server are generally far away from each other and usually interact through a communication network. The relationship between client and server arises by virtue of computer programs running on respective computers and having a client-server relationship with each other.

According to the technical solutions of the embodiments of the present application, the cloud acquires the root certificate of the first node first, and generates the target sub-certificate including the first sub-certificate of the first functional module of the first application associated with the first node based on the root certificate, i.e., the cloud generates the target sub-certificate, and sends the generated target sub-certificate to the terminal device. In this way, the first functional module of the first application in the terminal device may communicate through a corresponding target sub-certificate. That is, in the embodiments, the capability of managing the first sub-certificate of the first functional module in the terminal device may be improved through the first sub-certificate of the first functional module of the first application associated with the first node, which is issued by the cloud.

Figure 11:
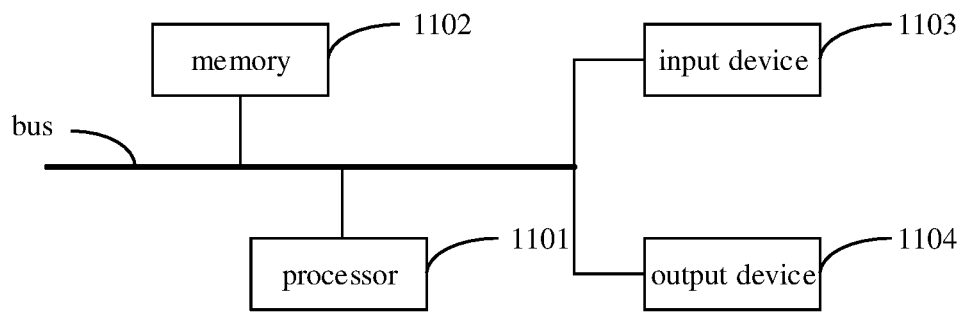
FIG. 11 is a block diagram of a terminal device used to implement the method for receiving the certificate in the embodiment of the present application.

FIG. 11 is a block diagram of a terminal device used to implement the method for receiving the certificate in an embodiment of the present application. The terminal device is intended to represent digital computers in various forms, such as a laptop computer, a desktop computer, a workstation, a personal digital assistant, a mainframe computer, and another suitable computer. The terminal device may further represent mobile apparatuses in various forms, such as personal digital processing, a cellular phone, a smart phone, a wearable device, and another similar computing apparatus. The components shown herein, connections and relationships thereof, and functions thereof are merely examples, and are not intended to limit the implementations of the present application described and/or required herein.

As shown in FIG. 11, the terminal device includes one or more processors 1101, a memory 1102, and an interface for connecting various components, including a high-speed interface and a low-speed interface. The components are connected to each other by using different buses, and may be installed on a common motherboard or in other ways as required. The processor may process an instruction executed in the terminal device, including an instruction stored in or on the memory to display graphical information of a GUM on an external input/output device (such as a display device coupled to an interface). In another implementation, if necessary, a plurality of processors and/or a plurality of buses may be used together with a plurality of memories. Similarly, a plurality of terminal devices may be connected, and each device provides some necessary operations (for example, used as a server array, a group of blade servers, or a multi-processor system). FIG. 11 illustrates a single processor 701 as an example.

The memory 1102 is a non-transitory computer-readable storage medium provided in the present application. The memory stores an instruction that is executable by at least one processor to perform the method for receiving the certificate provided in the present application. The non-transitory computer-readable storage medium in the present application stores a computer instruction, and the computer instruction is executed by a computer to implement the method for receiving the certificate provided in the present application.

As a non-transitory computer-readable storage medium, the memory 1102 may be used to store a non-transitory software program, a non-transitory computer-executable program, and a module, such as a program instruction/module corresponding to the method for receiving the certificate in the embodiment of the present application (for example, the second receiving module 801 shown in FIG. 8). By executing the non-transitory software programs, instructions and modules stored in the memory 1102, the processor 1101 performs various functional applications and data processing in the server, that is, implementing the method for sending the certificate in the foregoing method embodiments.

The memory 1102 may include a program storage area and a data storage area, where the program storage area may store an operating system, and an application program required for at least one function; and the data storage area may store data created according to usage of the terminal device having a keyboard and a display. In addition, the memory 1102 may include a high speed random access memory, and may also include a non-transitory memory, such as at least one magnetic disk storage device, a flash memory device, or other non-transitory solid state storage device. In some embodiments, the memory 1102 may optionally include a memory remotely located with respect to the processor 1101. These remote memories may be connected via a network to the terminal device having a keyboard and a display. Examples of the network mentioned above include, but are not limited to, the Internet, an intranet, a local area network, a mobile communication network, and a combination thereof.

The terminal device for implementing the method for receiving the certificate may further include: an input device 1103 and an output device 1104. The processor 1101, the memory 1102, the input device 1103 and the output device 1104 may be connected to each other through a bus or in other ways. In FIG. 11, a bus for connection is used as an example.

The input device 1103 may receive digital or character information that is inputted, and generate key signal input related to a user setting and function control of the terminal device for receiving the certificate, such as a touch screen, a keypad, a mouse, a trackpad, a touchpad, and a pointing stick, one or more mouse buttons, a trackball, a joystick, or other input devices. The output device 1104 may include a display device, an auxiliary lighting apparatus (for example, an LED), a tactile feedback apparatus (for example, a vibration motor), and the like. The display device may include, but is not limited to, a liquid crystal display (LCD), a light emitting diode (LED) display, and a plasma display. In some implementations, the display device may be a touch screen.

The various implementations of the system and technology described herein may be implemented in a digital electronic circuit system, an integrated circuit system, an application specific integrated circuit (ASIC), computer hardware, firmware, software, and/or a combination thereof. The various implementations may include: implementation in one or more computer programs that may be executed and/or interpreted by a programmable system including at least one programmable processor. The programmable processor may be a dedicated or general-purpose programmable processor, and may receive data and instructions from a storage system, at least one input device and at least one output device, and transmit the data and the instructions to the storage system, the at least one input device and the at least one output device. These computing programs (also referred to as programs, software, software applications, or codes) include machine instructions of a programmable processor, and may be implemented by using procedure-oriented and/or object-oriented programming language, and/or assembly/machine language. As used herein, the terms "machine-readable medium" and "computer-readable medium" refer to any computer program product, apparatus, and/or device (e.g., a magnetic disk, an optical disc, a memory, a programmable logic device (PLD)) for providing machine instructions and/or data to a programmable processor, including a machine-readable medium that receives machine instructions implemented as machine-readable signals. The term "machine-readable signal" refers to any signal used to provide machine instructions and/or data to a programmable processor.

To facilitate user interaction, the system and technique described herein may be implemented on a computer. The computer is provided with a display device (for example, a cathode ray tube (CRT) or liquid crystal display (LCD) monitor) for displaying information to a user, a keyboard and a pointing device (for example, a mouse or a track ball). The user may provide an input to the computer through the keyboard and the pointing device. Other kinds of devices may be provided for user interaction, for example, a feedback provided to the user may be any manner of sensory feedback (e.g., visual feedback, auditory feedback, or tactile feedback); and input from the user may be received by any means (including sound input, voice input, or tactile input).

The system and technique described herein may be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the system and technique described herein), or that includes any combination of such back-end component, middleware component, or front-end component. The components of the system can be interconnected in digital data communication (e.g., a communication network) in any form or a medium. Examples of communication networks include a local area network (LAN), a wide area network (WAN) and the Internet.

A computer system may include a client and a server. The client and the server are generally far away from each other and usually interact through a communication network. The relationship between client and server arises by virtue of computer programs running on respective computers and having a client-server relationship with each other.

According to the technical solutions of the embodiments of the present application, the terminal device receives a target sub-certificate including a first sub-certificate of a first functional module of a first application associated with a first node. In this way, the first functional module of the first application in the terminal device may communicate through the target sub-certificate. That is, in the embodiments, the first sub-certificate of the first functional module of the first application associated with the first node is issued by the cloud, and the terminal device receives the first sub-certificate of the first functional module of the first application associated with the first node issued by the cloud. Thus, the capability of managing the first sub-certificate of the first functional module in the terminal device may be improved.

It is appreciated, all forms of processes shown above may be used, and steps thereof may be reordered, added or deleted. For example, as long as expected results of the technical solutions of the present application can be achieved, steps set forth in the present application may be performed in parallel, in sequence, or in a different order, and there is no limitation in this regard.

The foregoing specific implementations constitute no limitation on the protection scope of the present application. It is appreciated by those skilled in the art, various modifications, combinations, sub-combinations and replacements can be made according to design requirements and other factors. Any modifications, equivalent replacements and improvements made without deviating from the spirit and the principle of the present application shall fall within the protection scope of the present application.

What is claimed is:

1. A method for sending a certificate, applied to a cloud, comprising:
   acquiring a root certificate of a first node;
   generating a target sub-certificate based on the root certificate, wherein the target sub-certificate comprises a first sub-certificate of a first functional module of a first application associated with the first node; and
   sending the target sub-certificate to a terminal device, wherein the target sub-certificate is used for the first functional module of the first application in the terminal device communicating through the target sub-certificate,
   wherein the target sub-certificate further comprises a second sub-certificate of a second functional module, and
   wherein sending the target sub-certificate to the terminal device comprises:
   sending a first resource associated with the second functional module and the second sub-certificate to the terminal device;
   receiving a first synchronization request sent by the second functional module in the terminal device based on the second sub-certificate; and
   in response to the first synchronization request, sending the first sub-certificate and a second resource associated with the first functional module of the first application to the terminal device.

2. The method according to claim 1, wherein after sending the target sub-certificate to the terminal device, the method further comprises:
   in a case that the target sub-certificate comprises an expired sub-certificate, updating the expired sub-certificate in the target sub-certificate to a new sub-certificate, and acquiring an updated target sub-certificate.

3. The method according to claim 2, wherein after updating the expired sub-certificate in the target sub-certificate to the new sub-certificate, and acquiring the updated target sub-certificate, the method further comprises:
   in a case of receiving a second synchronization request sent by the terminal device, in response to the second synchronization request, sending the updated target sub-certificate or the new sub-certificate in the updated target sub-certificate to the terminal device.

4. A method for receiving a certificate, applied to a terminal device, comprising:
   receiving a target sub-certificate sent by a cloud, wherein the target sub-certificate comprises a first sub-certificate of a first functional module of a first application associated with a first node;
   wherein the first functional module of the first application in the terminal device communicates through the target sub-certificate,
   wherein the target sub-certificate further comprises a second sub-certificate of a second functional module, and
   wherein receiving the target sub-certificate sent by the cloud comprises:
   receiving a first resource associated with the second functional module and the second sub-certificate sent by the cloud;
   transmitting the first resource and the second sub-certificate to a resource management center of the terminal device, and starting the second functional module through the resource management center according to the first resource;
   sending a first synchronization request through the second functional module based on the second sub-certificate; and
   receiving the first sub-certificate and a second resource associated with the first functional module of the first application that are sent by the cloud in response to the first synchronization request.

5. The method according to claim 4, wherein after receiving the target sub-certificate sent by the cloud, the method further comprises:
   sending a second synchronization request to the cloud; and
   receiving an updated target sub-certificate or a new sub-certificate in the updated target sub-certificate that is sent by the cloud in response to the second synchronization request, wherein the updated target sub-certificate is a sub-certificate acquired by updating an expired sub-certificate in the target sub-certificate to the new sub-certificate.

6. An apparatus for sending a certificate, applied to a cloud and comprising:
   at least one processor; and
   a memory communicatively connected to the at least one processor; wherein the memory stores instructions executable by the at least one processor, and when executing the instructions, the at least one processor is configured to:
   acquire a root certificate of a first node;
   generate a target sub-certificate based on the root certificate, wherein the target sub-certificate comprises a first sub-certificate of a first functional module of a first application associated with the first node; and
   send the target sub-certificate to a terminal device, wherein the target sub-certificate is used for the first functional module of the first application in the terminal device communicating through the target sub-certificate, wherein the target sub-certificate further comprises a second sub-certificate of a second functional module, and wherein the at least one processor is further configured to:

send a first resource associated with the second functional module and the second sub-certificate to the terminal device;

receive a first synchronization request sent by the second functional module in the terminal device based on the second sub-certificate; and in response to the first synchronization request, send the first sub-certificate and a second resource associated with the first functional module of the first application to the terminal device.

7. The apparatus according to claim 6, wherein the at least one processor is further configured to:

in a case that the target sub-certificate comprises an expired sub-certificate, update the expired sub-certificate in the target sub-certificate to a new sub-certificate, and acquire an updated target sub-certificate.

8. The apparatus according to claim 7, wherein the at least one processor is further configured to:

in a case of receiving a second synchronization request sent by the terminal device, in response to the second synchronization request, send the updated target sub-certificate or the new sub-certificate in the updated target sub-certificate to the terminal device.

9. An apparatus for receiving a certificate, applied to a terminal device and comprising:

at least one processor; and a memory communicatively connected to the at least one processor; wherein the memory stores instructions executable by the at least one processor, and when executing the instructions, the at least one processor is configured to implement steps of the method for receiving the certificate according to claim 4.

10. The apparatus according to claim 9, wherein the at least one processor is further configured to:

send a second synchronization request to the cloud; and receive an updated target sub-certificate or a new sub-certificate in the updated target sub-certificate that is sent by the cloud in response to the second synchronization request, wherein the updated target sub-certificate is a sub-certificate acquired by updating an expired sub-certificate in the target sub-certificate to the new sub-certificate.

11. A non-transitory computer-readable storage medium, storing thereon a computer instruction, wherein the computer instruction is configured to be executed to cause a computer to perform the method for sending the certificate according to claim 1.

12. A non-transitory computer-readable storage medium, storing thereon a computer instruction, wherein the computer instruction is configured to be executed to cause a computer to perform the method for receiving the certificate according to claim 4.

* * * * *